United States Patent
Collins (10) Patent No.: US 10,052,795 B2
(45) Date of Patent: Aug. 21, 2018

(54) SYSTEM AND A METHOD FOR PROCESSING PLASTIC, AND PLASTIC PROCESSED THEREFROM

(71) Applicant: POLYWASTE INTELLECTUAL PROPERTY PTY LIMITED, Kowloon (HK)

(72) Inventor: Ross Sydney Collins, Echuca (AU)

(73) Assignee: POLYWASTE INTELLECTUAL PROPERTY PTY LIMITED, Kowloon (HK)

(*) Notice: Subject to any disclaimer, the term of this patent is extended or adjusted under 35 U.S.C. 154(b) by 292 days.

(21) Appl. No.: 14/893,660

(22) PCT Filed: May 23, 2014

(86) PCT No.: PCT/AU2014/000547
§ 371 (c)(1),
(2) Date: Nov. 24, 2015

(87) PCT Pub. No.: WO2014/186836
PCT Pub. Date: Nov. 27, 2014

(65) Prior Publication Data
US 2016/0101541 A1    Apr. 14, 2016

(30) Foreign Application Priority Data

May 24, 2013  (AU) ................ 2013901893
Nov. 15, 2013 (AU) ................ 2013904431

(51) Int. Cl.
B29B 7/00  (2006.01)
B29B 7/82  (2006.01)
(Continued)

(52) U.S. Cl.
CPC ............ B29B 7/82 (2013.01); B02C 4/18 (2013.01); B02C 4/44 (2013.01); B29B 7/103 (2013.01);
(Continued)

(58) Field of Classification Search
CPC .... B02C 4/18; B02C 4/12; B02C 4/44; B29B 7/82; B29B 7/103; B29B 13/02;
(Continued)

(56) References Cited

U.S. PATENT DOCUMENTS 3,951,389 A * 4/1976 Porter ............... B29B 7/283
                                            366/142
5,538,343 A * 7/1996 Tynan ............... B01D 19/0052
                                            366/149

(Continued)

FOREIGN PATENT DOCUMENTS

CN  1063700 C   3/2001
DE  19706374 A1 8/1998
(Continued)

OTHER PUBLICATIONS

Supplementary European Search Report for corresponding European Application No. 14800852.7 dated Dec. 19, 2016.
International Search Report issued in corresponding application No. PCT/AU2014/000547 dated Jul. 25, 2014.
(Continued)

*Primary Examiner* — Anshu Bhatia
(74) *Attorney, Agent, or Firm* — Carter, DeLuca, Farrell & Schmidt, LLP (57) ABSTRACT

There is provided with a system [100] for processing plastic wherein, in use, the system is adapted for the frictional heating of the plastic.

8 Claims, 2 Drawing Sheets

(51) Int. Cl.

| | | |
|---|---|---|
| *B29B 13/02* | (2006.01) | |
| *B29B 17/00* | (2006.01) | |
| *B29C 45/46* | (2006.01) | |
| *B29C 47/52* | (2006.01) | |
| *B29B 7/10* | (2006.01) | |
| *B02C 4/18* | (2006.01) | |
| *B02C 4/44* | (2006.01) | |
| *B29B 9/10* | (2006.01) | |
| *B29L 7/00* | (2006.01) | |
| *B29B 9/12* | (2006.01) | |
| *B29C 47/54* | (2006.01) | |
| *B29K 105/00* | (2006.01) | |
| *B29K 105/26* | (2006.01) | |

(52) U.S. Cl.
CPC ............ *B29B 13/02* (2013.01); *B29B 13/022* (2013.01); *B29B 17/00* (2013.01); *B29B 17/0026* (2013.01); *B29C 45/46* (2013.01); *B29C 47/522* (2013.01); *B29B 9/10* (2013.01); *B29B 9/12* (2013.01); *B29C 47/54* (2013.01); *B29K 2105/256* (2013.01); *B29K 2105/26* (2013.01); *B29L 2007/008* (2013.01); *Y02W 30/62* (2015.05)

(58) Field of Classification Search
CPC ... B29B 13/022; B29B 17/00; B29B 17/0026; B29B 9/10; B29B 9/12; B30B 15/34; B29C 45/46; B29C 47/522; B29C 47/54; Y02W 30/62; B29K 2105/256; B29K 2105/26; B29L 2007/008
USPC .................................................. 366/76.7, 76.8
See application file for complete search history.

(56) References Cited

U.S. PATENT DOCUMENTS

| | | | | |
|---|---|---|---|---|
| 6,107,400 | A * | 8/2000 | Mariani | .............. B29B 17/0036 264/40.1 |
| 6,527,430 | B2 * | 3/2003 | Osborn | ................ B01F 3/1228 366/139 |
| 6,811,632 | B2 * | 11/2004 | Nelson | ................. B29C 66/836 156/272.2 |
| 2002/0125600 | A1 | 9/2002 | Horne | |
| 2003/0021991 | A1 | 1/2003 | Sugayoshi et al. | |
| 2007/0025176 | A1 * | 2/2007 | Naoi | ....................... B29B 7/183 366/76.7 |

FOREIGN PATENT DOCUMENTS

| | | |
|---|---|---|
| EP | 2431101 A1 | 3/2012 |
| GB | 1560927 A | 2/1980 |
| JP | S52-123448 A | 10/1977 |
| JP | H5-269735 A | 10/1993 |
| JP | 2000-263546 A | 9/2000 |
| JP | 2001-220589 A | 8/2001 |
| JP | 2002-114988 A | 4/2002 |
| JP | 2005-297507 A | 10/2005 |
| WO | 0210284 A1 | 2/2002 |

OTHER PUBLICATIONS

European Examination Report for corresponding EP Application No. 14800852.7 dated Nov. 20, 2017.
Australian Examination Report for corresponding AU Application No. 2014271200 dated Dec. 7, 2017.
Chinese Supplementary Search Report for corresponding CN Application No. 2014800299740 dated Feb. 23, 2018.
Japanese Office Action for corresponding JP Application No. 2016-514220 dated Mar. 13, 2018, with translation.

* cited by examiner

SYSTEM AND A METHOD FOR PROCESSING PLASTIC, AND PLASTIC PROCESSED THEREFROM

FIELD OF THE INVENTION

The present invention relates to plastic processing systems and in particular to a system and a method for processing plastic, and plastic processed therefrom.

BACKGROUND

According to existing arrangements, the processing of plastic, including the recycling thereof generally comprises the collection of suitable plastic for recycling, the heating thereof so as to pelletise the plastic, and, once pelletised, the subsequent reheating of the pelletised plastic for re-use, such as by way of injection moulding, extrusion or the like.

However, existing arrangements suffer from several disadvantages including the inability to process all types of plastic. Specifically, certain types of plastics such as film plastic, or contaminated plastic (such as plastic obtained from butchery process or waste beneficiation process or the like which may be contaminated with offal or food and the like) are generally ill suited for recycling and therefore simply sent to landfill.

Furthermore, existing arrangements are energy intensive, requiring the heating of the entire body of plastic for recycling, and in embodiments, the reheating of the recycled pelletised plastic.

Furthermore, existing plastic processing machines are provided with low tolerance requirements and therefore ill-suited for all types of plastics or foreign bodies within the plastic. For example, shredder or scissor type plastic processing machines may be fouled by film plastic. Furthermore, shredder or scissor type plastic processing machines, by comprising blades with low tolerance parameters, may be easily damaged by foreign bodies within the plastic.

Furthermore, existing plastic processing machines were generally adapted for processing a single type of plastic only and are therefore not suited for processing blends of plastic, such as is typical of plastic obtained from recycling and waste processing.

The present invention seeks to provide a system and a method for processing plastic, and plastic processed therefrom, which will overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY

A system for processing plastic wherein, in use, the system is adapted for the frictional heating of the plastic.

Advantageously, the frictional heating facilitates mixing of the plastic.

Preferably, the system comprises a frictional heater.

Preferably, the frictional heater is adapted to bear against the plastic in use.

Preferably, the frictional heater is adapted to rotate.

Preferably, the frictional heater is adapted to rotate sufficient speed to cause intimate mixing.

Preferably, the frictional heater is adapted to rotate at 110 rpm or more.

Preferably, the system further comprises a drive operably coupled to the frictional heater.

Preferably, the system further comprises a gear operably between the drive and the frictional heater.

Preferably, the drive is an electric drive.

Preferably, the drive is an internal combustion engine.

Preferably, the internal combustion engine is a diesel internal combustion engine.

Preferably, the frictional heater is adapted to bear against the plastic substantially along the axis of rotation.

Preferably, the frictional heater is adapted to bear against the plastic substantially perpendicular to the axis of rotation.

Preferably, the frictional heater is adapted to heat the plastic to greater than 80° C.

Preferably, the frictional heater is adapted to heat the plastic to greater than 100° C.

Preferably, the frictional heater is adapted to heat the plastic to greater than 160° C.

Preferably, the frictional heater comprises at least one molten plastic conduit.

Preferably, the frictional heater is substantially cylindrical.

Preferably, the frictional heater comprises at least one molten plastic conduit adapted to allow molten plastic to enter substantially within the cylinder.

Preferably, the system further comprises an output adapted to allow the molten plastic to flow therefrom in use.

Preferably, in use, the frictional heater is arranged to allow molten plastic to flow from within the frictional heater under gravity.

Preferably, the system further comprises a chamber adapted to confine the plastic in use.

Preferably, the chamber is adapted to direct the plastic towards the frictional heater.

Preferably, the chamber comprises an input.

Preferably, the pusher is adapted to hear the plastic against the frictional heater.

Preferably, the pusher is hydraulically driven.

Preferably, the pressure exerted by the pusher is configured in accordance with operational parameters.

Preferably, the operational parameters comprise plastic type.

Preferably, the pusher is shaped in accordance with the inner profile of the chamber.

Preferably, the pusher and the further pusher are adapted to bear the plastic against the frictional heater.

Preferably, the pressure exerted by the pusher and the further pusher are configurable.

According to another aspect, there is provided a method for processing plastic comprising the frictional heating of the plastic.

Preferably, the frictional heating is carried out by a frictional heater.

Preferably, the method further comprises pushing the plastic towards the frictional heater.

Preferably, the frictional heater is a rotational frictional heater.

Preferably, the frictional heater is adapted to rotate at sufficient speed to cause intimate mixing.

Preferably, the frictional heater is adapted to rotate at 110 rpm or more.

Preferably, the direction of pushing the plastic towards the frictional heater is substantially parallel to an axis of rotation of the frictional heater.

Preferably, the direction of pushing the plastic towards the frictional heater is substantially perpendicular to an axis of rotation of the frictional heater.

Preferably, the method comprises heating the plastic to greater than 80° C.

Preferably, the method comprises heating the plastic to greater than 100° C.

Preferably, the method comprises heating the plastic to greater than 160° C.

Preferably, the plastic is pushed towards the frictional heater with a force that corresponds with the plastic type.

Preferably, pushing the plastic towards the frictional heater comprises pushing the plastic towards the frictional heater from two or more directions.

Preferably, the method further comprises pushing the plastic towards the frictional heater with a first force and pushing other plastic towards the frictional heater with a second force.

According to another aspect there is provided plastic processed by a system described herein.

According to another aspect, there is provided plastic processed by a method described herein.

According to another aspect, there is provided a material coated with plastic processed by a system described herein.

According to another aspect, there is provided a material coated with plastic processed by a method described herein.

Other aspects of the invention are also disclosed.

BRIEF DESCRIPTION OF THE DRAWINGS

Notwithstanding any other forms which may fall within the scope of the present invention, a preferred embodiments of the invention will now be described, by way of example only, with reference to the accompanying drawings in which.

DESCRIPTION OF EMBODIMENTS

It should be noted in the following description that like or the same reference numerals in different embodiments denote the same or similar features.

Figure 1:
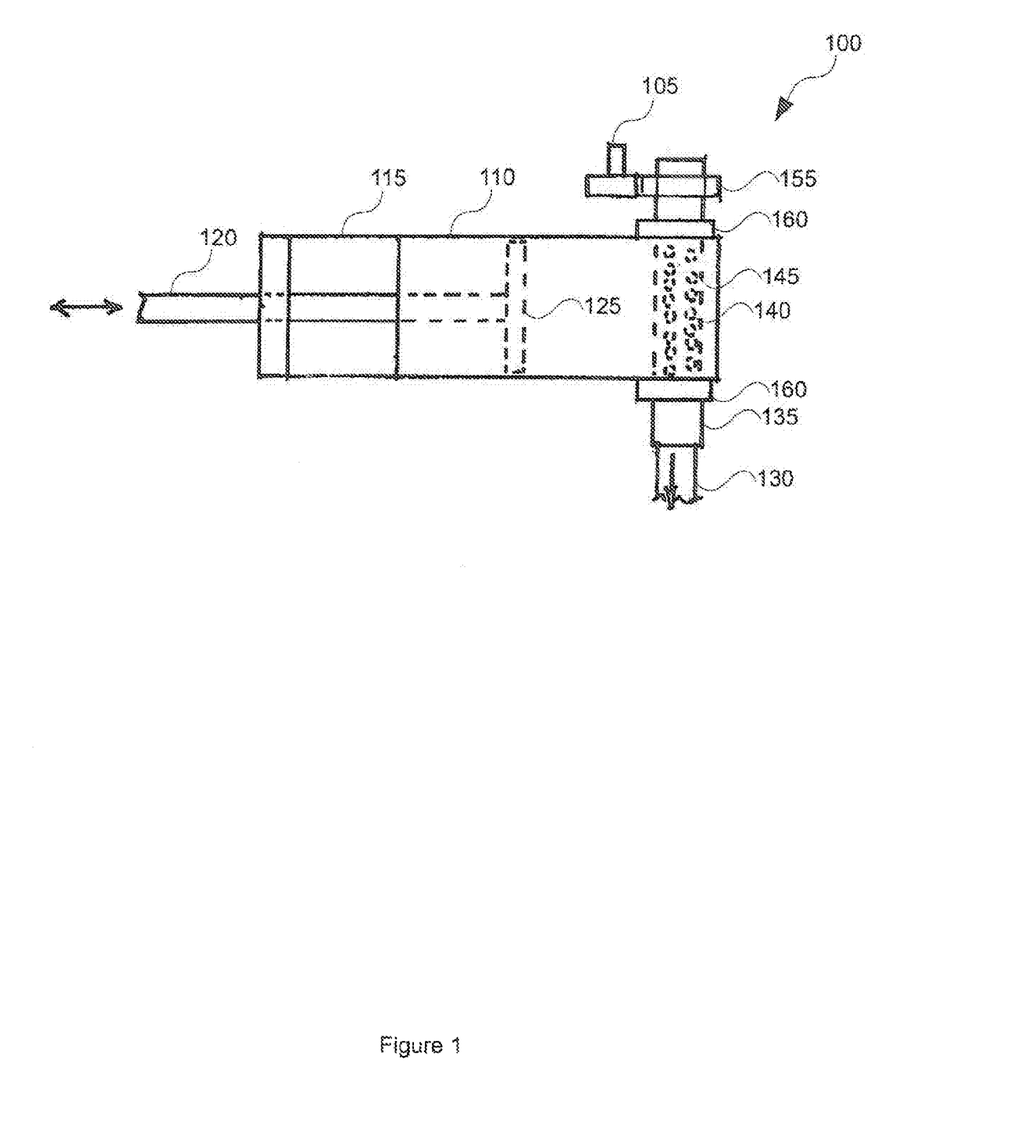
FIG. 1 shows a system for processing plastic in accordance with an embodiment of the present invention.

Referring to FIG. 1 there is shown in an embodiment of a system 100 adapted for processing plastic. As will become apparent from the description below, the system 100 is adapted for processing plastic, including the recycling of plastic. As will also become apparent from the description below, the system 100 provide advantages including advantages in energy efficiency, contaminant tolerance, differing plastic types and the like. Furthermore, the system 100 is adapted for processing plastic which would otherwise be sent for landfill, such as film type plastic which is generally ill suited for transportation and recycling.

Whereas prior art plastic processing systems utilise heaters, such as electric heaters, or the like in order to melt plastic the system 100 is adapted for frictional heating of the plastic.

Specifically, the system 100 is adapted to use friction in order to melt the plastic. Advantages of using friction to melt plastic comprise energy efficiency in only having to melt the plastic at a localised frictional face of the plastic as opposed to the entire body of plastic as with conventional arrangements. Further advantages include system robustness wherein, as will be described in further detail below, the frictional heater is robust when compared to existing plastic processing systems, which existing plastic processing systems include shredder or scissor type plastic processing systems having high tolerance requirements and therefore prone to failure, especially in the event of contaminant such as a foreign body within the plastic, and require frequent servicing, such as in the sharpening of cutters and the like.

As such, the system 100 comprises a frictional heater 145. In a preferred embodiment, the frictional heater 145 is adapted to rotate while bearing against the plastic so as to heat the plastic at the frictional face of the frictional heater 145. As alluded to above, localising the heating of the plastic at the frictional face reduces the energy requirements of the system 100 as compared to conventional arrangements. Generally, the frictional heater 145 is adapted to heat the plastic just to melting point until such time that the plastic can flow through a molten plastic conduit or the like as will be described in further detail below. As molten plastic flows away, unmolten plastic takes its place so as to be melted and so on and so forth.

Of course, differing plastics exhibit differing melting points. As such, certain plastics could potentially melt at 160° C., but other types of plastics, such as Nylon would melt at up to 240° C. prior to melting. However, as alluded to above, the system 100 is self-regulating in that as soon as the plastic becomes molten, the molten plastic flows through the frictional heat 145 to be replaced by adjacent non-molten plastic.

As the frictional heater 145 is adapted to rotate while bearing against the plastic so as to heat and melt the plastic, the shearing motion of the rotating viscous plastic mixture fragments and disperses solid and liquid components of the feed stocks ensuring an homogenous mix to produce uniform and coherent products and co-polymers.

While the frictional heater 145 is adapted to rotate in a preferred embodiment as alluded to above, in other embodiments the frictional heater 145 need not necessarily rotate and may take the form of a laterally travelling surface from the perspective of the plastic such as provided by metal band travelling past the plastic or the like.

However, where the frictional heater 145 is adapted to rotate in the preferred embodiment, as is apparent from FIG. 1, the fictional heater 145 comprises a cylindrical type arrangement adapted to rotate about an axis of rotation and wherein the plastic is adapted to hear against the frictional heater 145 in the direction substantially perpendicular to the axis of rotation. In other words, the plastic is driven towards the frictional heater 145 such that the plastic is heated by the outer periphery of the frictional heater 145.

However, in other embodiments the frictional heater 145 may be provided as a rotating plate wherein the plastic bears against the rotating plate in the direction substantially parallel with the axis of rotation of the rotating plate. In such an embodiment, the rotating plate may be a stationary rotating plate wherein the plastic is driven towards the rotating plate or alternatively, the rotating plate may additionally be driven towards the plastic. In such an embodiment, the plastic heated by the rotating plate may be dispersed towards the edges of the rotating plate and escape around the edges of the rotating plate so as to form a substantially cylindrical type arrangement once cooled.

Now, in a preferred embodiment, the frictional heater is adapted to rotate substantially at 110 rpm and sufficient speed to cause intimate mixing. However, in embodiments, other rotational velocity is may be utilised depending on the application. In one specific embodiments, the rotational velocity of the frictional heater 145 may be controllable in accordance with differing operational parameters such as desired throughput and the like.

It should be noted that one advantage of the system 100 is that there is substantially no resilience requirements of the frictional heater 145 and in embodiments, the frictional heater 145 may be manufactured from even mild steel.

Referring to FIG. 1, the system 100 comprises a drive 105 for driving the frictional heater 145. Between the drive 105 and the frictional heater 145, there may be a gear 155 adapted to attain the correct gearing ratio depending on the drive, operational parameters and the like. In one embodiment, the drive 105 may be an electric drive. For example, where an electric drive is used, a 55 kW electric motor may be used which may attain a throughput of substantially 250 kg of processed plastic per hour. However, and especially for portable type arrangements, the drive 145 may be an internal combustion engine, such as a diesel internal combustion engine.

The system 100 may further comprise a substantially plastic-tight bearing 160 at the interface of the frictional heater 145 and the chamber 110 (described below) so as to substantially prevent the escape of molten plastic therefrom in use.

Now, referring specifically to the frictional heater 145, in the embodiment given, the fictional heater 145 comprises at least one molten plastic conduit 140 (provided as small holes within the frictional heater 145 in the embodiments given) adapted to allow molten plastic to flow with therethrough. As such, the non-molten plastic bears against the frictional heater 145 until such time that the plastic becomes substantially molten. At this stage, the molten plastic is able to travel through the molten plastic conduit 140. In the arrangement given in FIG. 1, the substantially cylindrical frictional heater 145 comprises a plurality of molten plastic conduits 140 arranged radially, and substantially perpendicular the axis of rotation of the frictional heater 145. As such, the plastic melted by the frictional heater 145 travels through one or more of the molten plastic conduits 145 to substantially within the interior of the frictional heater 145.

Now, as the different molten plastics travels through the molten plastic conduit 140 intimate mixing of plastic types occurs and further, contaminants (oil, paper, aluminum foil, soil and the like) are fragmented by the shear forces of the rotating and flowing viscous molten plastic causing these contaminants to be finely dispersed throughout the molten mass.

It should be noted that in converse, less preferred embodiments, the plastic may be driven within the interior of the frictional heater such that once melted, the plastic escapes through the molten plastic conduits 140 to the exterior of the frictional heater 145.

The system 100 further comprises an outlet 135 adapted to allow the molten plastic to flow therefrom. Specifically, in the embodiment given there is shown the molten plastic 130 flowing from the outlet 135. On the embodiment given in FIG. 1, once the molten plastic has flown through the molten plastic conduits 140, the molten plastic is drawn under the effect of gravity through and out of the output 135.

Once the molten plastic flows out of the output 135, the molten plastic may be processed in many ways. One such way as to pelletise the molten plastic so as to be adapted for subsequent reheating and injection moulding such as by using a conventional injection moulding machine. However, so as to preferably retain the heat energy of the plastic and to attain energy efficiency, the molten plastic is processed in situ. In this regard, the molten plastic may be fed directly into an injection moulding machine, extruding device or the like.

In one embodiment, the molten plastic, as opposed to being recycled for further domestic or commercial use may be utilised to provide material handling and co-firing advantages for certain material. For example, for furnace coke, the furnace coke may be coated with molten plastic derived from system 100 so as to provide advantages in the handling, transportation, combustion and the like of the coke and also in the increased calorific index of the coke when burnt in the furnace. Of course, it must be appreciated that the molten plastic derived from the system 100 may be adapted for coating other material types also, especially hazardous material types which may provide advantages through a protective and encapsulating coating of plastic. In coating the material, the material may be introduced into a rotating drum or the like wherein the molten plastic is introduced into the rotating drum also such that the molten plastic adheres to the surface of the material. Such may be done at an elevated temperature so as to enhance the adherence of the molten plastic to the surface of the material. Of course, other technique may be employed for the purposes of coating and encapsulating, such as by dipping the material within a molten plastic bath, the pouring of the molten plastic over the material and the like.

Referring again to FIG. 1, the system 100 comprises a chamber 110 adapted to confine the plastic in use. Specifically, the chamber 110 is adapted to direct the plastic towards the frictional heater 145 in use. The system 100 further comprises an input 115 so as to be used in use to insert the plastic to within the chamber 110.

In certain applications, the plastic for recycling may comprise water. Therefore, in one embodiment, the system 100 comprises at least one vent so as to allow steam (and other gases) to escape therefrom without creating a pressure buildup. The at least one vent may be located at different locations depending on different applications, including through the body of the chamber 110 and through the pusher 125 (described below). The at least one vent may be used to monitor gases and vapours and include the fitting of a scrubber, known by those practiced in the art, to address any gaseous by-product issues.

Furthermore, the system 100 comprises a pusher 125 adapted to push the plastic against the frictional heater 145. As is apparent from the embodiment, the pusher 125 comprises a pusher face adapted to conform substantially to the interior cross-section of the chamber 110 so as to provide a substantially flush fit to effectively push the plastic towards the frictional heater 145.

In a preferred embodiment, the pusher 125 is pushed by hydraulic ram 120 or the like. In an embodiment, the hydraulic ram is pressurised to 1500 to 2000 psi such that, assuming that the ratio of the pusher face to the hydraulic ram face is a ratio of 1 to 50, the pressure applied against the molten plastic would be substantially 30 to 40 psi.

As is apparent from the embodiment, the pusher 125 is adapted to be drawn backwards so as to allow plastic to be inserted within the input 145 and subsequently bear forwards so as to push the inserted plastic towards the frictional heater 145.

The insertion of plastic may be automated wherein the reloading of the chamber 110 may be controlled by computer processor or the like in conjunction with controlling of a conveyor belt or the like so as to allow for the automated batch processing of plastic.

Figure 2:
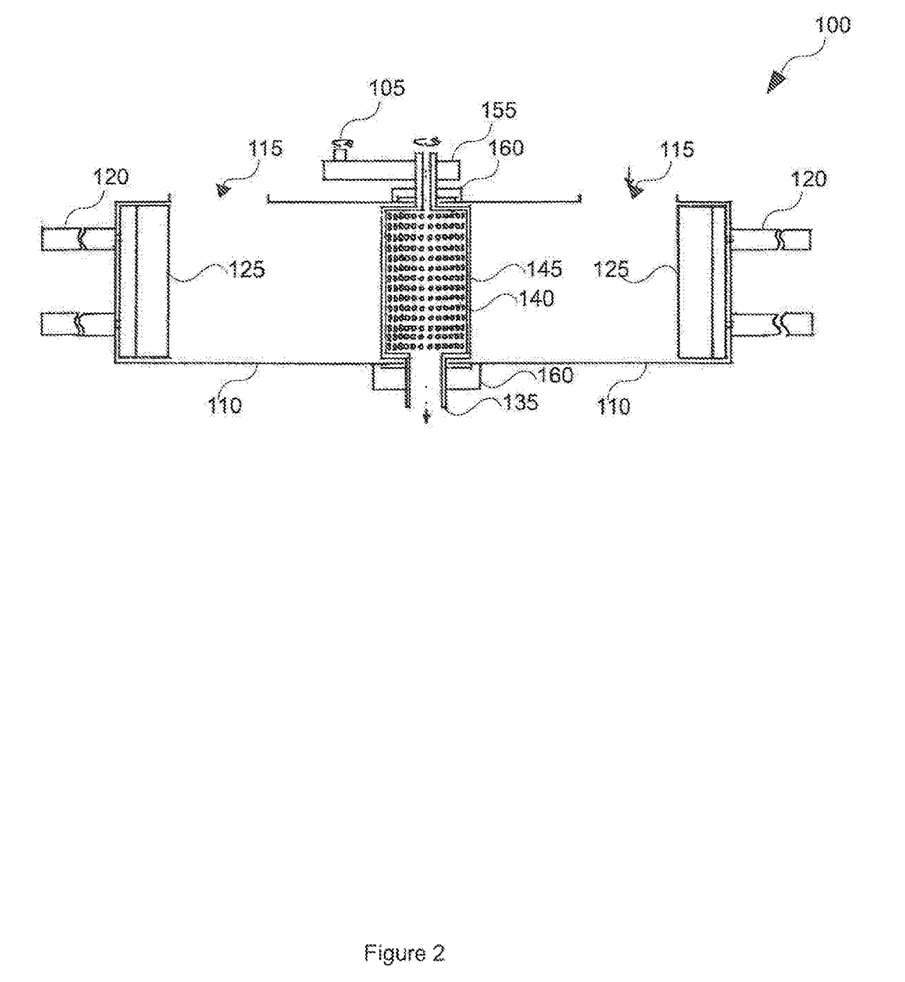
FIG. 2 shows a system for processing plastic in accordance with embodiment of the present invention.

Referring now to FIG. 2, there is shown in an alternative embodiment of the system 100. As is apparent, the system 100 as substantially given in FIG. 2 is at least distinguished from the embodiment given in FIG. 1 on account of there being more than one chamber 110 and respective pushers 135 within each chamber 110.

As such, in this embodiment, plastic may be pushed towards the frictional heater 145 in more than one direction. Specifically, the first pusher 125 in the first chamber 110 pushes first plastic towards the frictional heater 145 from a first direction and the second pusher 125 in the respective second chamber 110 pushers second plastic towards the frictional heater 145 from a different direction.

Advantages of using a multi-chamber system 100 include greater throughput, including not only in the greater capacity for frictional heating, but also in the great capacity for reloading. In one embodiment, each respective pusher 125 may operate asynchronously with each other so as to allow the reloading of one chamber while the contents of the other chamber are being pushed towards the pusher.

A further advantage of using a multichamber system 100 is in the blending of plastic types. In this manner, plastics may be selected in accordance with their qualities such that the resultant melted plastic comprises a blend of the properties of the respective plastic constituents. For example, a rigid plastic may be blended with a softer plastic so as to provide a plastic with semirigid properties. In one embodiment, during the blending process, the pressure or force exerted by each respective pusher may be controlled according to the desired properties of the resultant plastic. For example, if a softer resultant plastic were desired, the pusher associated with the chamber comprising the softer plastic would be pushed with greater pressure or force as opposed to the chamber comprising the harder plastic.

It should be appreciated that while in the embodiment provided there are shown two chambers 115, it should be appreciated that in other embodiments more than two chambers 110 may be utilised, depending on the application.

In accordance with the above embodiments, there is also provided a method for processing plastic comprising the frictional heating of the plastic, and plastic processed by a system or method as described herein. There is also provided a material coated with a plastic processed by a system or method as described herein.

Reference is made to the below Appendix A and Appendix B providing empirical plastic mix data reciting various characteristics of the resultant plastic product produced by a test system 100 utilising differing plastic types as input.

APPENDICES

Appendix A—First Empirical Plastic Mix Data

Common Plastics Available from Recycling and Waste Processing:
- High density polyethylene (HDPE) eg. chemical containers, detergent and cleaning product containers, crinkly shopping bags, shampoo containers
- Low density polyethylene (LDPE) eg. Most plastic bags
- Linear low density polyethylene (LLDPE) eg. silage wrap, pallet wrap, glad wrap, most stretch type films.
- Polypropylene (PP) eg. take away food containers, ice cream containers, baling twine, bulka bags, woven bags, tarpaulins
- Polyvinylchloride (PVC) eg. electrical cable insulation, glueable plumbing pipe and fittings, clear cordial and juice containers
- High impact polystyrene (HIPS) eg. food containers such as yoghurt and butter
- Polyethylene terepthalate (PET) eg. carbonated soft drink bottles, detergent bottles, packaging strapping
- Multi-layer laminated packaging comprising LDPE, HDPE, aluminium foil, paper-board eg. liquid food containers Small test rig experiments to date indicate that the shear and friction of the rotating viscous plastic melt is significant in achieving intimate mixing of feed stocks. Accordingly, appropriate blending, mixing and melting parameters allows the use of many plastics and plastic composites that otherwise could not be effectively recycled, and the range of plastic mixes that comprise possible input and output variants is endless. Some general examples are set out below:
- HDPE, LDPE & LLDPE will all bond together very well when processed in either a mixed arrangement or when sorted to type. These plastics are the most widely available and would be best suited for manufacturing products requiring maximum durability.
- HDPE alone produces a rigid product while LDPE and LLDPE produce a flexible product. The most suitable blend can be selected to suit requirements. In the case of products such as drainage pipe and posts a blend of 50% HDPE-50% LLDPE or LDPE is well suited. The 50-50 HDPE-LLDPE blend produces the most durable product making it best suited for pipe production.
- With ageing and each time plastic is heated some plasticizer is lost and this can cause brittleness with repeated recycling. The addition of LDPE & or LLDPE & or mineral oil effectively adds plasticizer eliminating the brittleness in instances where a plastic is recycled multiple times. Plasticizing additives are available but are quite expensive.
- To produce a structurally sound product blended plastics must be thoroughly mixed while molten and contaminants finely dispersed throughout the mix.
- In the HDPE, LDPE & LLDPE blends, PP is a suitable substitute to HDPE and results in a more rigid product. PP alone tends to be brittle, but a blend may be suitable for products such as posts or pack spacers,
- Processing PVC alone in the test rig produced some toxic gases. This was probably due to hot spots created when the stationary disc makes contact with the spinning barrel. As the system 100 has no metal to metal contact processing PVC is feasible but extreme care would be necessary to avoid overheating the PVC and generating hazardous and toxic gases. A scrubber, known by those practiced in the art, could be fitted to the at least one vent to deal with gaseous by-product issues. The end product was very soft and flexible. PVC does not appear compatible with other plastics.
- Processing PET in the system 100 was successful but the centrifugal moulding technique caused brittleness. Other tests revealed in order to stop the brittleness PET must be moulded while barely molten.
- Processing HIPS in the test rig was successful but the product was brittle. Mixed plastics that are not normally compatible could still be acceptable in limited quantities when fragmented by the shearing action of the rotating viscous mixing process and would be considered the same as other contaminates such as paper, aluminium foil and soil, which end up as small particles, evenly distributed throughout the product such that these contaminants would simply act as filler and have minimal effect on the structure of the plastic or the integrity of extruded products. Some plastic products have added filler powder simply because filler is cheaper than resin.

Although not suitable for products such as pipe and posts, mixed plastics with a high proportion of incompatible plastics and other contaminates such as food residues could still be utilised for fuel pasties (i.e. for co-firing with other combustible materials in a bonded format). As long as the plastic component of the pastie can still each plastic type is fed into the system 100, or through the supply and feeding of mixed plastics arising from waste processing activities where the individual plastic types are not separated but left in a mixed state with no control on mix proportions.

In addition to the foregoing general examples, the following specific examples are relevant to demonstrate the flexibility possible in both the plastics that can be recycled and the products that can be produced:

| Mix | Advantages and Characteristics |
|---|---|
| Typical Polyethylene Mixes - blending to suit properties: | |
| 40-90% HDPE 10-60% LDPE or LLDPE | Mixes in this range can achieve properties similar to virgin HDPE. The percentages depend on variables such as, the age of the raw materials, the original properties of the raw materials and the properties required in the end product. The more aged the HDPE the more LDPE or LLDPE will be required to effectively re plasticise back to virgin properties. |
| 90-99% HDPE 1-10% mineral oil or vegetable oil | The oil re-plasticises the HDPE (in a similar manner to the addition of LDPE or LLDPE above). The percentages can be varied to suit the rigidity-flexibility properties required in the end product. Increasing the HDPE increases the rigidity while increasing the LDPE, LLDPE or oil increases the flexibility. |
| Typical Polyethylene - Polypropylene mixes - blending to suit colour: | |
| 10-90% LDPE or LLDPE. 10-90% PP | PP woven material and PE film are both considered difficult to recycle and attract a low or negative value. White PP and clear or white PE film are very common. Combinations result in a white or opaque colour plastic, which can then be coloured as required, giving a much broader product range, such as roadside white posts, high visibility stock fencing & in general more aesthetically pleasing products. |
| Typical plastic composite - blending to utilise otherwise un-recyclable plastics | |
| 1-50% Laminated plastic, Al foil, paper composite 50-99% HDPE, PP, LDPE & LLDPE | Plastic composites considered impossible to recycle can be included | be moulded the durability of the plastic is of little importance. One of the samples is a 50-50 blend of coke and LDPE, essentially 50% contamination, but with this technology a product can still be moulded.

For white posts a suitable mix is 48% white 20 ltr containers HDPE—48% clear film LDPE—4% white master hatch.

The system 100 has capacity to receive mixed and contaminated plastics from waste beneficiation plants such as material recovery facilities (MRFs), dry commercial and industrial waste sorting facilities (Dirty MRFs) and alternative waste treatment facilities (AWTs). Facilities of the likes of MRFs, Dirty MRFs and AWT produce an off-take waste stream of contaminated mixed plastics of negative commercial value—i.e. the operator of the facility has to pay a third party to take this material for subsequent processing. Typical subsequent processing might include energy from waste, sorting washing and flaking. However, the system 100 allows this off-take stream to be processes as is, melted and blended then extruded onto combustible materials for co-firing in energy from waste facilities, steel making facilities, cement kilns and the like.

The system 100 has capacity to receive and melt a mixture of plastics, with the composition of the mixture determined either by actual measurement of components as Oil as a Plasticiser:

Previously, whereas plastic film contaminated with animal fat (cheese) and the like tended to degrade the plastic causing some brittleness, results show that 50-50 HDPE/LDPE with 10% mineral oil (engine oil) contamination produced a satisfactory plastic product not prone to brittleness. Indeed, mineral oil appears to have acted like a plasticizer.

As such, HDPE containers with both vegetable oil and mineral oil residues are well suited for introduction into the system 100 thereby advantageously providing an abundant source of low cost plastic.

The oil does not appear to degrade the plastic and actually acts as a plasticiser in a similar way to LDPE film. 10% oil has a similar effect to 50% LDPE film.

Oil contaminated HDPE could be extruded into high value products.

Vegetable oil appears to have the same effect as mineral oil.

The oil did reduce the friction between the plastic and the frictional heater 145, but the melt rate could be maintained by simply increasing the load on the frictional heater 145.

Waste oil, may prove to be an effective low cost plasticizer for products recycled several times.

Appendix B—Second Empirical Plastic Mix Data

Two classes of product mix are described:

1. Extruded or moulded mixes to manufacture durable products such as pipes, posts, planks, spacers, protective packaging (dunnage), bearing pads (vibration insulation, and other WPCs (wood plastic composites); and
2. Extruded or moulded mixes to manufacture moulded or coated products such as fuel briquettes, coated fuels, encapsulated wastes.

Four classes of materials that comprise the mix constituents are described:

1. Primary plastics materials that comprise the basis of a mix such as HDPE (high-density polyethylene), LDPE (low-density polyethylene), LLDPE (linear low-density polyethylene), PP (polypropylene), HIPS (high impact polystyrene), PET (polyethylene terephthalate); and
2. Additive materials to the primary plastic materials that enhance the physical properties of a mix (rigidity, flexibility, UV stability, plasticity, thermal expansion rate) such as mineral oil, vegetable oil, carbon black, and other granular powder materials such as crumb rubber and sawdust; additive materials may be added to the mix either before or after the melt phase; and
3. Contaminant materials that may be included with or attached to the primary plastic materials that add no specific value or beneficial attribute to the end product but can be accommodated within the blend without great detriment to the utility of the manufactured product.
4. Co-product materials that may be coated by a material mix to produce a composite fuel suitable for firing into combustion devices such as incinerators, cement kilns, steel-making furnaces, coal-fired power stations and the like, and may include conventional solid fuels such as coal, coke, charcoal, timber, sawdust, and/or other combustible materials such as plastics, paper products etc.; co-product materials may be added to the mix either before or after the melt phase.

Typical mixtures are set out in the following table.

| | Materials as Mix Constituents | Mixes to Manufacture Durable Products | Mixes to Manufacture Moulded or Coated Products |
|---|---|---|---|
| Primary Plastics[1,2] | HDPE | 0%-100% | 50%-100% |
| | LDPE[3] | 0%-100% | 50%-100% |
| | LLDPE[3] | 0%-100% | 50%-100% |
| | PP | 0%-100% | 50%-100% |
| | HIPS | 0%-100% | 50%-100% |
| Additive Materials | Mineral Oil | 0%-15% | 0%-15% |
| | Vegetable Oil | 0%-15% | 0%-15% |
| | Carbon Black | 0%-5% | |
| | Crumb Rubber | 0%-5% | |
| | Sawdust | 0%-50% | |
| Contaminant Materials | Contaminants in aggregate | 0%-10% | N.A. |
| | Other plastics[4] | 0%-10% | 0%-30% |
| | Associated materials[5] | 0%-5% | 0%-30% |
| | Attached materials[6] | 0%-5% | 0%-10% |
| | Animal fats and grease | 0%-2% | 0%-10% |
| Co-Product Materials | Solid fuels | N.A. | 0%-50% |
| | Other combustibles | | 0%-30% |

Notes:
[1]In mixes to manufacture durable products, primary plastics may be blended in various ratios to produce mixes with different physical properties such as rigidity, flexibility.
[2]In mixes to manufacture moulded or coated products, primary plastics may be blended in any combination.
[3]LDPE and LLDPE may be incorporated in additional amounts as an additive material to increase plasticity and/or to replace plasticisers lost or destroyed in heating.
[4]Other plastics include plastics types other than a primary plastic type, such as PS/EPS (polystyrene/expanded polystyrene), PVC (polyvinyl chloride), ABS/SAN (acrylonitrile butadiene styrene/styrene acrylonitrile), PU (polyurethane), polyester, nylon, and other aggregated polymer types.
[5]Associated items include materials or products that are associated with the product that is comprises a primary plastic in a mix, such as plastic caps and labels from plastic bottles, adhesives and tales on joins, aluminium foil and paper products in composites, etc.
[6]Attached materials include extraneous matter and substances that are attached to the surface of a primary plastic as a result of its former use, application, treatment or handling prior to incorporation of the primary plastic in a mix, such as soil, vegetation and plant matter, food residues, oils, detergents, soaps and other chemicals, etc., but excluding animal fats and grease.

Interpretation

Embodiments

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description of Specific Embodiments are hereby expressly incorporated into this Detailed Description of Specific Embodiments, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Different Instances of Objects

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

Specific Details

In the description provided herein, numerous specific details are set forth. However, it is understood that embodiments of the invention may be practiced without these specific details. In other instances, well-known methods, structures and techniques have not been shown in detail in order not to obscure an understanding of this description.

Terminology

In describing the preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar technical purpose. Terms such as "forward", "rearward", "radially", "peripherally", "upwardly", "downwardly", and the like are used as words of convenience to provide reference points and are not to be construed as limiting terms.

Comprising and Including

In the claims which follow and in the preceding description of the invention, except where the context requires otherwise due to express language or necessary implication, the word "comprise" or variations such as "comprises" or "comprising" are used in an inclusive sense, i.e. to specify the presence of the stated features but not to preclude the presence or addition of further features in various embodiments of the invention.

Any one of the terms: including or which includes or that includes as used herein is also an open term that also means including at least the elements/features that follow the term, but not excluding others. Thus, including is synonymous with and means comprising.

Scope of Invention

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

Although the invention has been described with reference to specific examples, it will be appreciated by those skilled in the art that the invention may be embodied in many other forms.

INDUSTRIAL APPLICABILITY

It is apparent from the above, that the arrangements described are applicable to the plastic processing industry.

The invention claimed is:

1. A system for processing plastic wherein, in use, the system is adapted for the frictional heating of the plastic, the system comprising: a frictional heater having an axis of rotation, the frictional heater defining a substantially cylindrical outer periphery adapted in use to bear against the plastic substantially perpendicular to the axis of rotation and wherein a pusher is adapted to push the plastic against the frictional heater in use so as to heat the plastic by frictional engagement with the substantially cylindrical outer periphery of the frictional heater; a drive operably coupled to the frictional heater; a chamber comprising an input and being adapted to confine the plastic and direct the plastic towards the frictional heater in use; wherein the frictional heater comprises a plurality of molten plastic conduits arranged radially and substantially perpendicular to the axis of the rotation of the frictional heater; the plurality of molten plastic conduits being adapted to allow molten plastic to flow from the outer periphery so as to enter substantially within the frictional heater; and wherein the frictional heater is configured to allow molten plastic to flow from within the frictional heater and out of an outlet under gravity.

2. A system as claimed in claim 1, wherein the frictional heater is adapted to rotate at sufficient speed to cause intimate mixing.

3. A system as claimed in claim 1, wherein the frictional heater is adapted to rotate at a speed conducive to melting the plastic to form a homogeneous mixture.

4. A system as claimed in claim 1, wherein the frictional heater is adapted to heat the plastic to greater than 80° C.

5. A system as claimed in claim 1, wherein the pusher is hydraulically driven.

6. A system as claimed in claim 1, wherein the pusher is shaped in accordance with an inner profile of the chamber.

7. A system as claimed in claim 1, further comprising a further chamber adapted for confining further plastic and a further pusher located within the further chamber and wherein the pusher and the further pusher are adapted to bear the plastic against the frictional heater.

8. A system as claimed in claim 7, wherein a pressure exerted by the pusher and the further pusher are independently configurable.

* * * * *